US011797010B2

(12) United States Patent
Bertaia (10) Patent No.: US 11,797,010 B2
(45) Date of Patent: Oct. 24, 2023

(54) DEVICE FOR AUTONOMOUS DRIVE OF WHEEL-EQUIPPED APPARATUSES, AND RELATED METHOD OF INSTALLATION

(71) Applicant: Alba-Robot SRL, Turin (IT)

(72) Inventor: Andrea Bertaia, Turin (IT)

(73) Assignee: Alba-Robot SRL, Turin (IT)

( * ) Notice: Subject to any disclaimer, the term of this patent is extended or adjusted under 35 U.S.C. 154(b) by 0 days.

(21) Appl. No.: 17/758,321

(22) PCT Filed: Dec. 22, 2020

(86) PCT No.: PCT/IB2020/062331
§ 371 (c)(1),
(2) Date: Jul. 1, 2022

(87) PCT Pub. No.: WO2021/137099
PCT Pub. Date: Jul. 8, 2021

(65) Prior Publication Data
US 2023/0039405 A1 Feb. 9, 2023

(30) Foreign Application Priority Data

Jan. 2, 2020 (IT) .......................... 102020000000025

(51) Int. Cl.
*G05D 1/02* (2020.01)
*A61G 5/04* (2013.01)

(52) U.S. Cl.
CPC .............. *G05D 1/021* (2013.01); *A61G 5/04* (2013.01); *G05D 2201/0206* (2013.01)

(58) Field of Classification Search
CPC .......................... A61G 5/04; G05D 2201/0206
See application file for complete search history.

(56) References Cited

U.S. PATENT DOCUMENTS 7,894,951 B2 * 2/2011 Norris ..................... H04L 67/12
180/443
9,919,741 B2 * 3/2018 Kim ..................... B60W 10/20
(Continued)

FOREIGN PATENT DOCUMENTS

MX  2017005757 A  11/2018

OTHER PUBLICATIONS

International Preliminary Report on Patentability dated Jul. 5, 2022, issued in PCT Application No. PCT/IB2020/062331, filed Dec. 22, 2020.

(Continued)

*Primary Examiner* — Gertrude Arthur Jeanglaude
(74) *Attorney, Agent, or Firm* — Workman Nydegger (57) ABSTRACT

A device for autonomous drive of a wheel-equipped apparatus, the wheel-equipped apparatus including a drive component operationally connected to a control component adapted to control the drive component, the control component being adapted to be operated manually by a user, the device being adapted to be operationally connected to the drive component, the device having storage adapted to store at least one electric signal corresponding to at least one manual control operated by the user on the control component, and wherein the device is adapted to autonomously control the drive component, as an alternative to the control component, by way of the at least one electric signal stored in the storage.

12 Claims, 4 Drawing Sheets

(56) References Cited

U.S. PATENT DOCUMENTS

| | | | |
|---|---|---|---|
| 10,245,937 B2* | 4/2019 | Gillett | B62K 17/00 |
| 10,780,915 B2* | 9/2020 | Rakouth | B62D 5/091 |
| 11,543,821 B2* | 1/2023 | Corbett | G05D 1/0088 |
| 2016/0167653 A1 | 6/2016 | Malone et al. | |
| 2017/0266069 A1 | 9/2017 | Lozano et al. | |
| 2018/0224853 A1 | 8/2018 | Izhikevich | |
| 2018/0364711 A1 | 12/2018 | Goldfain et al. | |
| 2019/0250619 A1 | 8/2019 | Gillett | |

OTHER PUBLICATIONS

International Search Report dated Mar. 4, 2021, issued in PCT Application No. PCT/IB2020/052331, filed Dec. 22, 2020.
Written Opinion dated Mar. 4, 2021, issued in PCT Application No. PCT/IB2020/052331, filed Dec. 22, 2020.

* cited by examiner

Fig. 4

DEVICE FOR AUTONOMOUS DRIVE OF WHEEL-EQUIPPED APPARATUSES, AND RELATED METHOD OF INSTALLATION

BACKGROUND OF THE INVENTION

1. The Field of the Invention

The present invention relates to a device for autonomous drive of wheel-equipped apparatuses, in accordance with the preamble of claim 1. In particular, the following will illustrate a device for autonomous drive of wheelchairs, along with the associated method of installation.

2. The Relevant Technology

The scope of the present invention embraces a device, and the related method of installation, for autonomous drive of wheelchairs, stretchers, trolleys or similar wheel-equipped apparatuses.

The device and the associated method of installation of the present invention can be easily used on such wheel-equipped apparatuses, which may be used both in indoor environments, e.g., hospitals, airports, shopping centres, etc., and in outdoor environments, e.g., city centres, pedestrian precincts, parks, etc.

Kits are currently known which permit the installation of electric drive units on push-type wheelchairs in order to make them more easily movable by a user, such as, for example, the system described in Mexican patent application MX2017005757, or the "Light Drive" unit (http://progettiamoautonomia.it/prodotto/propulsione-per-carrozzina-light-drive). These kits allow the user to control the wheelchairs whereon they have been installed by means of control systems manually operated by the user, such as, for example, joysticks, push-buttons, etc.; however, such kits do not allow wheel-equipped apparatuses, such as wheelchairs, whereon they have been installed, to move autonomously. As an alternative, wheelchairs are also known which are specifically designed to move autonomously, i.e., without the help from a user. Let us consider, for example, United States patent application US2017266069, which discloses an autonomous-drive wheelchair. Such systems often prove to be much more expensive than kit-type or similar solutions, in that they are solutions implemented by using components specifically dedicated to autonomous drive applications, which are especially costly, such as, for example, 3D LIDAR units.

SUMMARY OF THE INVENTION

It is therefore one object of the present invention to solve these and other problems of the prior art, in particular by providing a device for autonomous drive of wheel-equipped apparatuses, and an associated method of installation, which can be used with wheel-equipped apparatuses fitted with drive units controlled by means of control systems manually operated by the user.

It is another object of the present invention to provide a device for autonomous drive of wheel-equipped apparatuses, along with the associated method of installation, which can be installed easily regardless of the type of drive system used by the wheel-equipped apparatus.

It is another object of the present invention to provide a device for autonomous drive of wheel-equipped apparatuses, along with the associated method of installation, which is less expensive than current self-moving wheel-equipped apparatuses.

The invention described herein consists of a device, along with an associated method of installation, which is easy to configure and which allows for autonomous drive of wheel-equipped apparatuses comprising electric drive units originally controllable by a user by means of manually operated control systems.

Further advantageous features of the present invention are set out in the appended claims, which are an integral part of the present description.

BRIEF DESCRIPTION OF THE DRAWINGS

The invention will now be described in detail through some non-limiting exemplary embodiments thereof, with particular reference to the annexed drawings, wherein.

DETAILED DESCRIPTION OF THE PREFERRED EMBODIMENTS

Figure 1:
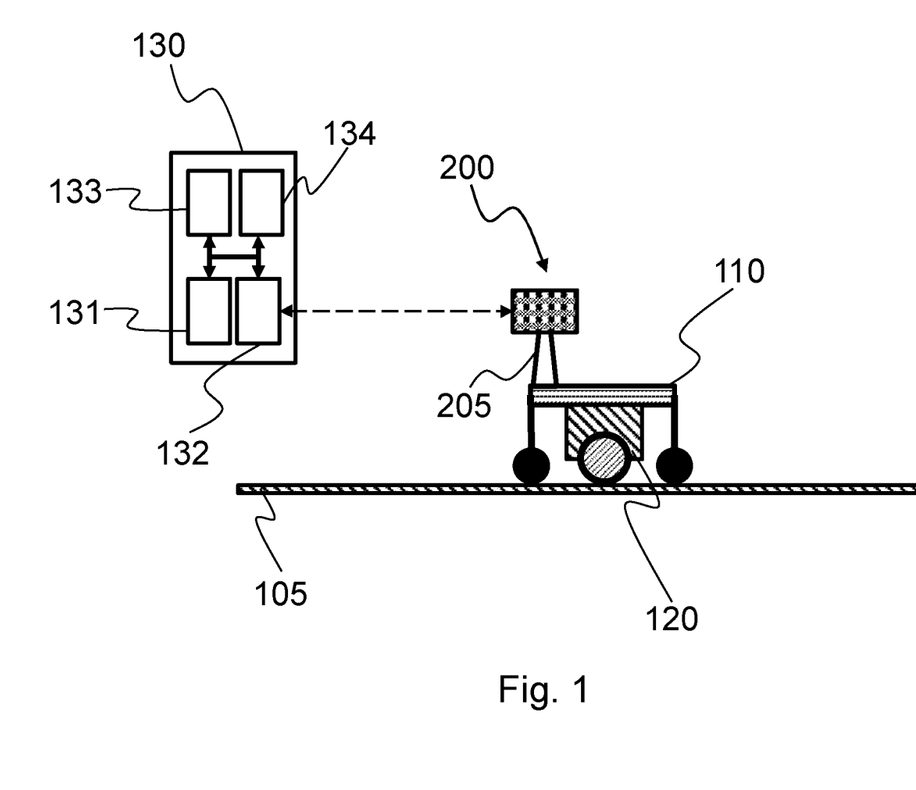
FIG. 1 schematically shows an example of use of a device for autonomous drive of a wheel-equipped apparatus according to an embodiment of the present invention.
Figure 2:
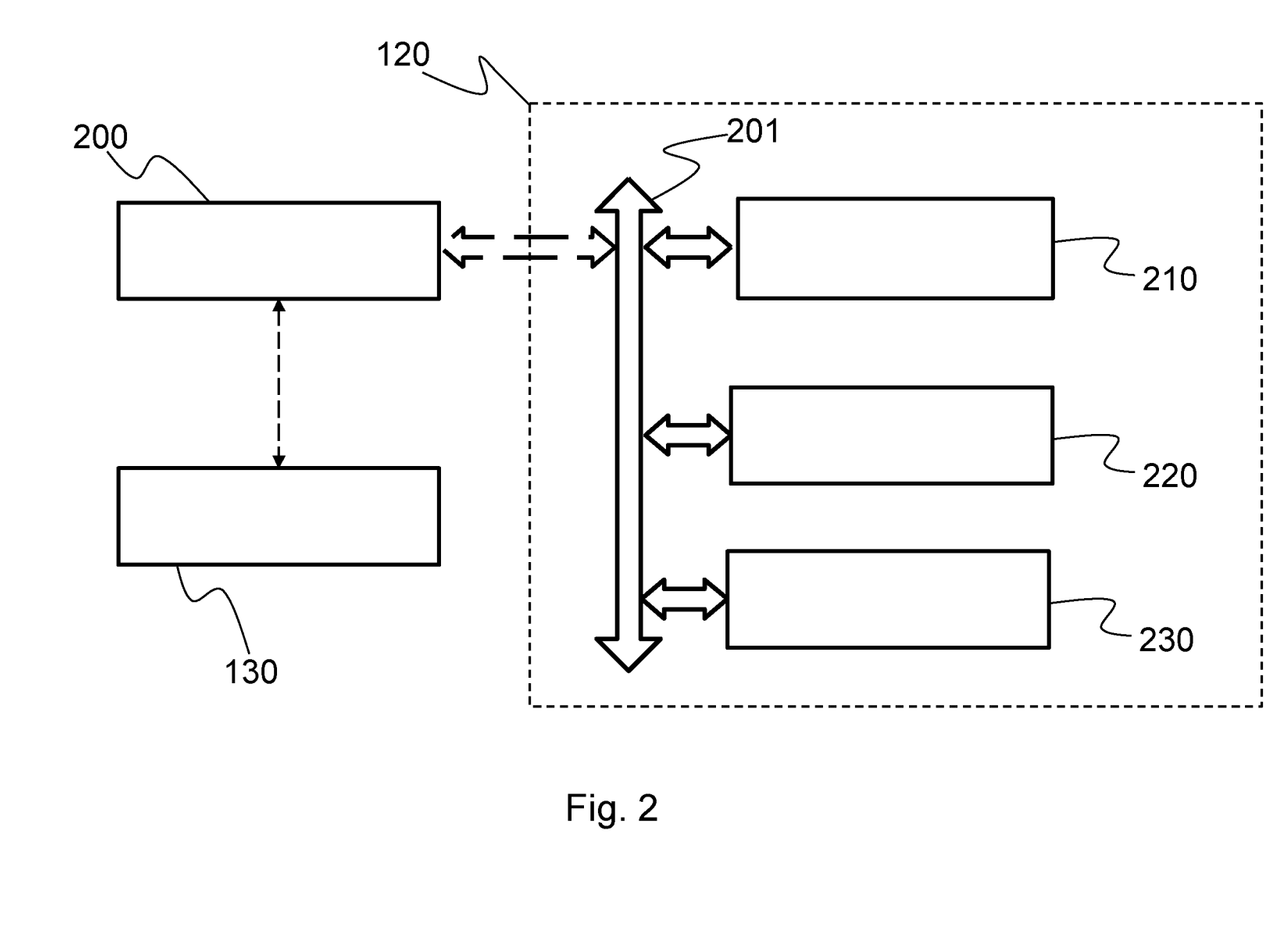
FIG. 2 shows an illustrative block diagram of the connections between the device for autonomous drive of the wheel-equipped apparatus of FIG. 1 and the drive system of the latter.

With reference to FIGS. 1 and 2, there is shown an illustrative diagram of the use of a device 200 for autonomous drive of a wheel-equipped apparatus 110 and a management unit 130 according to an embodiment of the present invention.

The wheel-equipped apparatus 110 may comprise drive means 220 operationally connected to control means 210 adapted to control said drive means 220, the control means 210 being adapted to be operated manually by the user. The wheel-equipped apparatus 110 may comprise power supply means 230, which supply power to the drive means 220 and to the control means 210. Together, said control means 210, drive means 220 and power supply means 230, which are operationally connected to one another, e.g., via a data/power bus 201, constitute a drive system 120 of the wheel-equipped apparatus 110, as schematized by way of example in FIG. 2.

The wheel-equipped apparatus 110 may be, for example, a wheelchair originally designed to be moved by the drive means 220, e.g., an electric motor. In the present embodiment of the invention, the drive means 220 may be anchored to the wheel-equipped apparatus 110 in such a way as to remain in contact with a support surface 105. Alternatively, the drive means 220 may be anchored to the wheel-equipped apparatus 110 in such a way as to remain in contact with the wheels of said wheel-equipped apparatus 110, e.g., by friction.

The control means 210 are adapted to control the drive means 220 and may comprise, for example, joysticks, push-buttons, etc. The control means 210 are operationally connected to the drive means 220, e.g., via the data/power bus 201 adapted to transport the signals outputted by the control means towards the drive means 220. In one embodiment of the invention, the data/power bus 201 may also supply power to the control means 210, e.g., taking it from the power supply means 230. The control means 210 are adapted to be operated manually by the user. For example, the control means 210 may comprise four push-buttons with the symbols "/\", "\/", "<", ">", which indicate controls for moving said wheel-equipped apparatus 110 forwards, backwards, leftwards and rightwards. The user can therefore operate the control means 210 manually in order to move the wheel-equipped apparatus 110, e.g., forwards by pressing the push-button identified as "/\". Consequently, the control means 210 will output at least one electric signal corresponding to that manual control, designated as "/\", operated by the user on said control means 210. The electric signal may be, for example, an analog or digital value of electric voltage or electric current flowing through the data/power bus 201 towards the drive means 220, which will then be activated in accordance with the electric signal received to move the wheel-equipped apparatus 110 forwards.

The power supply means 230 are adapted to supply power to the drive means 220 and/or to the control means 210 and/or to further devices that may be installed on said wheel-equipped apparatus 110, such as, for example, the device 200 of the present invention. The power supply means 230 may comprise, for example, one or more lithium, nickel/cadmium, etc. batteries. For example, the power supply means 230 may supply power to the drive means 220 and/or to the control means 210 and/or to said further devices via the data/power bus 201 or via a wire harness specially dedicated to the power supply function.

The device 200 is adapted to be anchored to said wheel-equipped apparatus 110 by anchoring means 205, so that it is mechanically integral with the structure of said wheel-equipped apparatus 110. The anchoring means 205 may comprise, for example, arms that can be manually and/or automatically extended from the device 200 by means of actuators 200. The anchoring means 205 may comprise elements configured to be hooked to the structure of said wheel-equipped apparatus 110. Such elements may be, for example, clamps manually or automatically adjustable by means of actuators. The anchoring means 205 may be adjustable, e.g., in height, so as to better adhere to the structure of said wheel-equipped apparatus 110. The anchoring means 205 may anchor the device 200 directly, or may anchor specific mounting systems, also by third parties. The anchoring means 205 may comprise connectors adapted to electrically connect said device 200 to transfer power and/or signals from said device 200 to the drive means 220. Such signals may be exchanged, for example, by means of a digital interface, such as, for example, CANBUS, RS485, etc., or by means of an analog interface.

The management unit 130 is adapted to manage said at least one device 200 for autonomous drive of at least one wheel-equipped apparatus 110. Said management unit 130 may be used by the user, for example, in order to set a path of said at least one device 200 and to display such path for the user him/herself. The management unit 130 may comprise, for example, a memory 131, an interface module 132, an input/output module 133 and a processor 134 operationally connected with one another; the management unit 130 may be, for example, a computer, a smartphone, a tablet, etc.

The memory 131 of the management unit 130 is adapted to internally store information about the management of said at least one device 200 for autonomous drive of at least one wheel-equipped apparatus 110. Such information may comprise, for example, data received from the device 200, e.g., values indicating the position, speed and operating state of the device 200, maps of at least a portion of the environment where said device 200 is operating, and so forth.

Such information is sent and/or received by the management unit 130 in communication with said device 200 by means of the interface module 132, which may be, for example, a USB, ETHERNET, WiFi, Bluetooth, GSM interface or the like. For example, in the present embodiment of the invention said device 200 may be connected to the interface module 132 of the management unit 130 by means of a Bluetooth interface.

The input/output module 133 allows the user to interact with the management unit 130. The input/output module may comprise output and input means, e.g., a display and an alphanumeric keyboard, respectively, or, alternatively, a touchscreen displaying an alphanumeric keyboard and interactive symbols.

The processor 134 of the management unit 130 is adapted to process the information contained in the memory 131 of the management unit 130, e.g., in order to generate one or more paths for said device 200. The processor 134 of the management unit 130 is adapted to display, via said input/output module 133, the generated maps and/or the state of the device 200.

The management unit 130 may be implemented, for example, as a computer program product comprising portions of software code, which can be loaded into a memory of a smartphone, a tablet or a computer equipped with interface means such as, for example, a USB, ETHERNET, WiFi, Bluetooth, GSM interface or the like.

In one embodiment of the invention, the management unit 130 may be a user's smartphone, which is connected, via the interface module 132, to said device 200 anchored to said wheel-equipped apparatus 110, e.g., a wheelchair being used by the user, wherein the device 200 is adapted to autonomously move the wheel-equipped apparatus 110 to which it has been anchored, also as a function of the information exchanged with the management unit 130. In a further embodiment of the invention, the device 200 is adapted to autonomously move the wheel-equipped apparatus 110 to which it has been anchored as a function of the information recorded inside of it.

Figure 3:
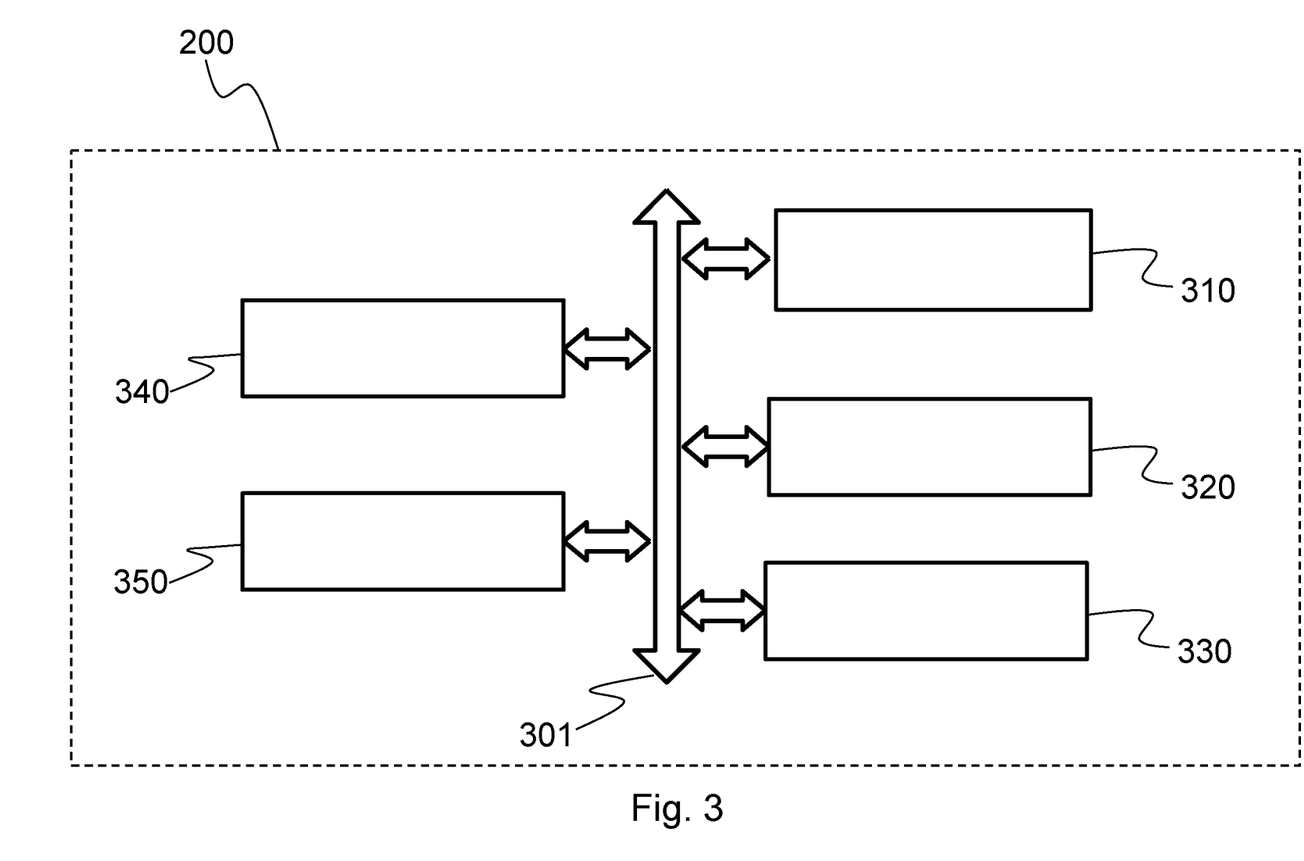
FIG. 3 shows an illustrative block diagram of the device for autonomous drive of the wheel-equipped apparatus of FIG. 1.

FIG. 3 shows an illustrative structural diagram of the device 200 for autonomous drive of a wheel-equipped apparatus 110, with reference to FIG. 1. The device 200 may comprise communication means 330, interface means 320, sensor means 310, storage means 340 and processing means 350. Such means may be interconnected via a communication bus 301.

The communication means 330 are adapted to establish a communication channel with at least one management unit 130. The communication means 330 may comprise, for example, a USB, CANBUS, ETHERNET, WiFi, Bluetooth, GSM, etc. interface.

The interface means 320 are adapted to receive and transmit input/output information of the device 200. The interface means 320 may comprise, for example, a screen for displaying the path of the wheel-equipped apparatus 110, a microphone for vocally controlling the movements of the wheel-equipped apparatus 110, a loudspeaker for audio communications with a remote operator; the screen, the microphone and the loudspeaker may be housed, for example, in a control panel of the device 200. The device 200 may also comprise a video camera to allow a remote operator to remotely view the path being followed by the wheel-equipped apparatus 110. For example, in case of movement problems, the operator will be able to take control of the device 200 and hence of the wheel-equipped apparatus 110 to move it to a predetermined place. The device 200 may also comprise a barcode/RFID reader, e.g., for reading medical recipes and computing the path from the current position of the device 200 to a room for specific tests that the user will have to undergo. Said device 200 may be electrically connected in parallel to an output data line, such as, for example, the data/power bus 201, of the control means 210 through the interface means 320, e.g., via connectors compliant with the CANBUS, USB, RS232, RS485, etc. interfaces.

The sensor means 310 are adapted to acquire values of quantities concerning said device 200. For example, said sensor means 310 may acquire physical quantities useful for the autonomous drive of said device 200, such as, for example, accelerometers, speedometers, etc. The sensor means 310 may comprise, for example, an inertial platform or inertial measurement unit (IMU) and/or a global navigation satellite system (GNSS). The sensor means 310 may also comprise one or more radars or infrared sensors to obtain information useful for collision avoidance, e.g., by executing a vertical scan in order to detect the presence of obstacles and/or differences in level (steps) along a path being followed by the wheel-equipped apparatus 110.

The storage means 340 are adapted to store the information and the instructions of the device 200 for autonomous drive of the wheel-equipped apparatus 110 according to the present embodiment of the invention, and may comprise, for example, a flash-type solid-state memory. The information may comprise a set of values and/or parameters useful for the autonomous drive of the wheel-equipped apparatus 110, such as, for example, a set of maps for autonomous drive of the wheel-equipped apparatus 110, the state of the inputs and outputs of the interface means 320, electric signals corresponding to at least one manual control operated by the user on said control means 210, values of several physical quantities acquired by the sensor means 310, such as, for example, temperature values, electric current values, electric voltage values, etc. The instructions stored in the storage means 340 will be described in detail hereinafter with reference to the flow chart of FIG. 4.

The processing means 350 are adapted to process the information and the instructions stored in the storage means 340 in relation to the communication means 330 and the interface means 320, and may comprise, for example, a multicore ARM processor, an Arduino microcontroller, etc. The processing means 350 execute low-level operations such as, for example, Path-Finding, Real-Time-Obstacle-Avoidance and Tip-Over-Prevention operations in Safety-Critical mode, in accordance with the reference standards. The processing means 350 may establish a communication between the device 200 and the management unit 130 via said communication means 330. The processing means 250 may process the information and the instructions stored in the storage means 340 in relation to the communication means 330 and the interface means 340, and may execute high-level operations such as, for example, Off-Line-Obstacle-Avoidance operations based on one or more static maps stored in said storage means 340. The processing means 350 may implement telecommunication functions via said communication means, e.g., with a remote server, a lift or other domotic devices. The processing means 350 may implement advanced functions like, for example, recognition of user voice commands acquired by the microphone of the device 200.

The communication bus 301 is adapted to interconnect said communication means 330, interface means 320, sensor means 310 and storage means 340 with the processing means 350.

Figure 4:
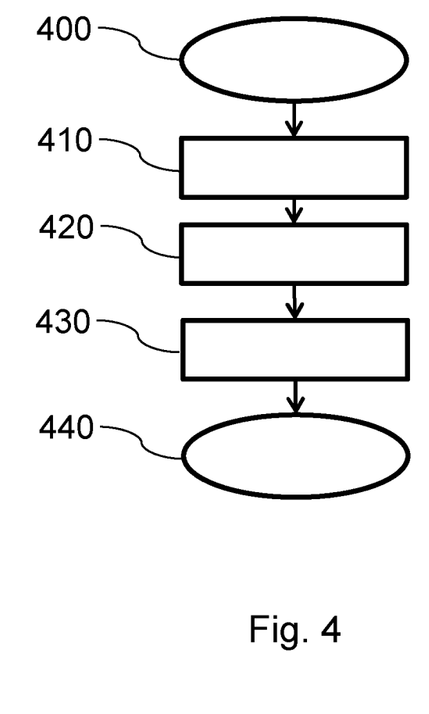
FIG. 4 shows an illustrative flow chart of a method of installation of the device with reference to FIG. 3.

With reference to FIG. 4, the following will describe an exemplary method of installation of the device 200 for autonomous drive of at least one wheel-equipped apparatus 110. As previously described, said wheel-equipped apparatus 110 comprises the drive means 220, which are operationally connected to the control means 210, which are adapted to control said drive means 220, the control means 210 being adapted to be operated manually by the user.

At step 400 a phase of initializing the device 200 is carried out in order to bring it into an operational condition. In this step, the operating state of the device 200 and/or the operating state of the drive means 220 and control means 210 are verified. Such verification may be carried out, for example, by an operator trained to set up the device 200.

At step 410 a phase of analyzing the commands of the control means 210 is carried out. During this phase, at least one electric signal outputted by the control means 210 and sent towards the drive means 220, e.g., via the data/power bus 201, is determined. Said at least one electric signal corresponds to at least one manual control operated by the user on the control means 210. For example, during this phase the operator may measure at least one electric signal outputted by the control means 210, by means of a measurement tool such as, for example, a tester or an oscilloscope, thus determining the circuit characteristics of the data/power bus 201 through which said at least one electric signal outputted by the control means 210 flows. Such circuit characteristics may be, for example, the position of the wire carrying said at least one electric signal outputted by the control means 210 in the data/power bus 201 and/or the type of analog/digital electric signal and/or the coding standard of the electric signal, and so forth. During this phase, the operator may use information concerning the drive system 120, e.g., its circuit diagram.

At step 420 a connection phase is carried out, wherein the device 200 is electrically connected to said drive means 220 on the basis of the information determined in said phase of analyzing the commands, described at step 410. Said information may comprise the circuit characteristics of the data/power bus 201 through which said at least one electric signal outputted by the control means 210 flows. The electric connection may be obtained, for example, by connecting at least one connector, e.g., a female one, in the data/power bus 201. The matching connector, e.g., a male one, allows said at least one electric signal to be carried, via electric wires, towards the interface means 230 of the device 200. In one embodiment of the invention, the device 200 may be electrically connected in parallel to the output data line of the control means 210 via the interface means 320, e.g., connected by means of the male/female connectors.

At step 430 a configuration phase is carried out, wherein the device 200 stores, via the storage means 340, said at least one electric signal corresponding to at least one manual control operated by the user on said control means 210. During this phase, for example, the operator operates the controls on the control means 210 one at a time, resulting in the emission of at least one corresponding electric signal; such signal is received by the interface means 320 of the device 200. Consequently, the processing means 350 store said at least one electric signal, corresponding to at least one actuated manual control, into the storage means 340, associating it with the control that generated said at least one electric signal. Let us assume, for example, that the control means 210 comprise four push-buttons with the following symbols "A", "v", "<", ">", which indicate, respectively, commands for moving said wheel-equipped apparatus 110 forwards, backwards, leftwards and rightwards. During this phase the operator can manually operate, one at a time, the control means 210, e.g., by pressing the button designated as "∧". The control means 210 emit a corresponding electric signal, e.g., a digital electric voltage signal coded as "00"; such signal is then received by the interface means 320 of the device 200 and stored, by the processing means 350, into the storage means 340. Such digital electric voltage signal coded as "00" is associated with the label "FORWARD" corresponding to the actuated control. The association of the actuated control may be made by the operator by interacting with the interface means 320, e.g., by interacting with a screen and a keyboard comprised in the interface means 320. Alternatively, the association of the actuated control may be made automatically with reference to the sensor means 310, e.g., one or more accelerometers and/or GPS positioning systems, etc., based on the variations occurring in the detected quantities, e.g., forward, backward, rightward, leftward acceleration, etc. The same operations are carried out for the remaining push-buttons, designated as "∨", "<", ">", each one of which may correspond, for example, to the digital electric signals "11", "10", "01" and to the labels "BACKWARD", "LEFT" "RIGHT". This information may be stored by the processing means 350 into the storage means 340, e.g., in a table wherein each row is associated with a label of a control and the corresponding electric signal.

At step 440 an autonomous drive phase is carried out, wherein said device 200 autonomously controls said drive means 220, as an alternative to said control means 210, by means of said at least one electric signal stored in said storage means 340. During this phase, the processing means 350 of the device 200 execute one or more algorithms known in the art in order to autonomously move the wheel-equipped apparatus 110 to which it has been anchored. Consequently, the processing means 350 transmit to the drive means, via said interface means 320, at least one electric signal corresponding to at least one command stored in the storage means 340, as discussed at step 430. For example, assuming that the wheel-equipped apparatus 110 must autonomously follow a path created by the following command sequence: "FORWARD", "RIGHT", "FORWARD", "LEFT", "BACKWARD", "RIGHT"; the processing means will transmit to the drive means 220, via the interface means 320, the following sequence of signals: "00", "01", "00", "10", "11", "01". These signals may have a predefined time length, e.g., two seconds each, and therefore the entire path described in this example will last, in total, twelve seconds. Of course, the control signals may be formatted in such a way as to contain further information, e.g., the speed of the wheel-equipped apparatus 110, the acceleration of the wheel-equipped apparatus 110, the time of execution of each command, and so forth. During this phase, the device 200 will interrupt said autonomous drive phase in the event that the control means 210 output at least one electric signal corresponding to at least one manual control operated by the user on the control means 210. For example, the processing means 350 of the device 200 may periodically detect, via the interface means 230, at least one electric signal corresponding to at least one manual control operated by the user on said control means 210, e.g., when the push-button "∨" is pressed; in this case, the corresponding electric signal detected by the processing means will be "11". For example, if such electric signal is different from the electric signal generated by the processing means 350 during the autonomous drive phase, then the device 200, i.e., the processing means 350 of the device 200, will interrupt the autonomous drive phase of the wheel-equipped apparatus 110. In another embodiment of the invention, the device 200, i.e., the processing means 350 of the device 200, will interrupt the autonomous drive phase of the wheel-equipped apparatus 110 as soon as the control means 210 output at least one electric signal corresponding to at least one manual control operated by the user on the control means 210.

The advantages of the present invention are apparent in light of the above description. The device and the associated method of installation according to the present invention advantageously allow wheel-equipped apparatuses fitted with drive units controlled by control systems manually operated by the user to operate autonomously.

Another advantage of the present invention lies in the fact that it provides a device for autonomous drive of wheel-equipped apparatuses, along with an associated method of installation, which is less expensive than current self-moving wheel-equipped apparatuses.

A further advantage of the present invention lies in the fact that it provides a device for autonomous drive of wheel-equipped apparatuses, along with the associated method of installation, which can be installed easily regardless of the type of drive system used by the wheel-equipped apparatus.

Of course, without prejudice to the principle of the present invention, the forms of embodiment and the implementation details may be extensively varied from those described and illustrated herein merely by way of non-limiting example, without however departing from the protection scope of the present invention as set out in the appended claims.

The invention claimed is:

1. A device for autonomous drive of a wheel-equipped apparatus, said wheel-equipped apparatus comprising drive means operationally connected to control means adapted to control said drive means; said control means being adapted to be manually manipulated by a user into a plurality of different positions with each of said plurality of different positions controlling a different operation of said wheel-equipped apparatus, an electric signal being outputted from said control means at each of said plurality of different positions, each electric signal corresponding to one of said different operations of said wheel-equipped apparatus, wherein
said device is adapted to be operationally connected to said drive means and comprises storage means adapted to store each electric signal being outputted from said control means as the control means is manually manipulated to each of said plurality of different positions, and wherein said device is adapted to autonomously control said drive means, as an alternative to said control means, by means of said electric signals stored in said storage means.

2. The device according to claim 1, comprising interface means, wherein said device is adapted to be electrically connected in parallel to an output data line of said control means via said interface means.

3. The device according to claim 1, wherein said device is adapted to interrupt said autonomous control of said drive means in the event that said control means output one of said electric signals corresponding to one of said different operations of said wheel-equipped apparatus.

4. The device according to claim 1, wherein said device is adapted to be anchored to said wheel-equipped apparatus by anchoring means.

5. The device according to claim 1, comprising communication means, wherein said device is adapted to communicate with a management unit adapted to manage said at least one device.

6. A method of installation of a device for autonomous drive of at least one wheel-equipped apparatus, said wheel-equipped apparatus comprising drive means operationally connected to control means adapted to control said drive means, and said control means being adapted to be operated manually by a user, said method comprising:
- a phase of analyzing the commands of said control means, wherein said control means is manually manipulated into a plurality of different positions with each of said plurality of different positions controlling a different operation of said wheel-equipped apparatus, an electric signal being outputted from said control means at each of said plurality of different positions, each electric signal corresponding to one of said different operations of said wheel-equipped apparatus;
- a connection phase, wherein said device is electrically connected to said drive means on the basis of information determined in said phase of analyzing the commands;
- a configuration phase, wherein said device stores, via storage means, each electric signal being outputted from said control means at each of said plurality of different positions;
- an autonomous drive phase, wherein said device autonomously controls said drive means, as an alternative to said control means, by means of said at least one electric signals stored in said storage means.

7. The method according to claim 6, wherein said device is electrically connected in parallel to an output data line of said control means via interface means.

8. The method according to claim 6, wherein said device interrupts said autonomous drive phase in the event that said control means output one of said electric signals corresponding to one of said different operations of said wheel-equipped apparatus.

9. The method according to claim 6, comprising an anchorage phase wherein said device is anchored to said wheel-equipped apparatus by anchoring means.

10. The method according to claim 6, wherein said device communicates with a management unit adapted to manage said at least one device.

11. The method according to claim 6, wherein said control means can be manually manipulated into said plurality of different positions by moving a joystick into a plurality of different positions or by depressing a plurality of different buttons.

12. The method according to claim 6, wherein said different operations of said wheel-equipped apparatus include forward movement, rearward movement, leftward movement, and rightward movement of the wheel-equipped apparatus.

* * * * *